(12) United States Patent  
Hashimoto et al.

(10) Patent No.: US 12,386,489 B2  
(45) Date of Patent: Aug. 12, 2025

(54) INFORMATION TERMINAL DEVICE AND APPLICATION OPERATION MODE CONTROL METHOD OF SAME

(71) Applicant: Maxell, Ltd., Kyoto (JP)

(72) Inventors: Yasunobu Hashimoto, Kyoto (JP); Kazuhiko Yoshizawa, Kyoto (JP); Naohisa Takamizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/910,445

(22) PCT Filed: Mar. 12, 2020

(86) PCT No.: PCT/JP2020/010801  
§ 371 (c)(1),  
(2) Date: Sep. 9, 2022

(87) PCT Pub. No.: WO2021/181604  
PCT Pub. Date: Sep. 16, 2021

(65) Prior Publication Data  
US 2023/0124173 A1 Apr. 20, 2023

(51) Int. Cl.  
*G06F 3/04842* (2022.01)  
*G06F 3/04817* (2022.01)

(52) U.S. Cl.  
CPC ...... *G06F 3/04842* (2013.01); *G06F 3/04817* (2013.01)

(58) Field of Classification Search  
CPC .. G06F 3/04842; G06F 3/04817; G06F 3/011; G06F 9/445  
See application file for complete search history.

(56) References Cited

U.S. PATENT DOCUMENTS

| | | |
|---|---|---|
| 2013/0019279 A1 | 1/2013 | Aida et al. |
| 2013/0135353 A1* | 5/2013 | Wheeler .................. G06F 3/013 345/660 |
| 2015/0319364 A1* | 11/2015 | Jin ....................... H04N 23/631 348/220.1 |

(Continued)

FOREIGN PATENT DOCUMENTS

| | | | |
|---|---|---|---|
| JP | 2013-021632 A | 1/2013 | |
| JP | 2013003742 A * | 1/2013 | ......... G06F 3/04883 |

(Continued)

OTHER PUBLICATIONS

Bryan Wolfe, How to use the Camera app on Apple Watch, Sep. 6, 2019, 16 pages (Year: 2019).*

(Continued)

*Primary Examiner* — Jennifer N Welch  
*Assistant Examiner* — Parmanand D Patel  
(74) *Attorney, Agent, or Firm* — Mattingly & Malur, PC

(57) ABSTRACT

An object is to provide an information terminal device that improves convenience of use in operation mode control of an application that performs cooperative operation with a plurality of information terminal devices, and an application operation mode control method of same. Accordingly, an information terminal device that executes applications is configured to activate an application by selecting between a solo operation mode and a cooperative operation mode, depending on a form of activation instruction for the application.

3 Claims, 19 Drawing Sheets

(56) References Cited

U.S. PATENT DOCUMENTS

| | | | | |
|---|---|---|---|---|
| 2016/0041619 A1* | 2/2016 | Ishiwata | ............... | G06F 3/0304 |
| | | | | 715/857 |
| 2019/0391716 A1 | 12/2019 | Badr et al. | | |
| 2020/0112711 A1* | 4/2020 | Enriquez | ............... | G06T 19/006 |
| 2020/0258305 A1* | 8/2020 | Abe | ................... | G05B 19/4184 |
| 2020/0359083 A1* | 11/2020 | Chung | ................. | G06F 3/0482 |
| 2021/0255461 A1* | 8/2021 | Watanabe | ................ | G09G 5/00 |

FOREIGN PATENT DOCUMENTS

| | | | | | |
|---|---|---|---|---|---|
| JP | 2014-178894 A | | 9/2014 | | |
| JP | 2015-022457 A | | 2/2015 | | |
| JP | 2015099978 A | * | 5/2015 | | |
| JP | 2015126467 A | * | 7/2015 | ......... | H04N 21/4126 |
| JP | 2016-507970 A | | 3/2016 | | |
| JP | 2016126687 A | * | 7/2016 | | |
| WO | WO-2014006758 A1 | * | 1/2014 | ........... | G06F 1/1626 |
| WO | 2014/162762 A1 | | 10/2014 | | |
| WO | 2020/003361 A1 | | 1/2020 | | |

OTHER PUBLICATIONS

International Search Report of PCT/JP2020/010801 dated Jul. 7, 2020.
1 International Search Report of PCT/JP2020/010801 dated Jul. 7, 2020.
Japanese Office Action received in corresponding Japanese Application No. 2022-507112 dated May 28, 2024.

* cited by examiner

INFORMATION TERMINAL DEVICE AND APPLICATION OPERATION MODE CONTROL METHOD OF SAME

TECHNICAL FIELD

The present invention relates to an information terminal device and an application operation mode control method of the same.

BACKGROUND ART

Recently, various products have been commercially available for information terminal devices such as a smart phone or a smart watch, and opportunities to use the products have increased. In addition, a head mounted display device (hereinafter, referred to as HMD) that is one of the information terminal devices and is worn on the head to view information has been widely used in the field of game application or work support.

An application (hereinafter, referred to as app) that is operated by such information terminal devices may include a solo operation mode in which the application is operated solely by one information terminal device, and a cooperative operation mode in which the application is operated in cooperation by a plurality of information terminal devices.

Patent Document 1 is provided as the background art of this technical field. An object of Patent Document 1 is to provide an information processing system that is capable of transmitting information to a cooperation destination without decreasing security, and in Patent Document 1, an information processing system executing cooperative processing in which a terminal device and a cooperative processing device are connected to transmit electronic data to a cooperation destination, the system including: a cooperation destination management unit managing information for specifying a reliable cooperation destination; and a cooperation unit checking whether or not the cooperation destination to which the electronic data is transmitted is the reliable cooperation destination, on the basis of the information for specifying the reliable cooperation destination, to transmit the electronic data managed by the cooperative processing device to the cooperation destination when the cooperation destination is the reliable cooperation destination is disclosed.

CITATION LIST

Patent Document

Patent Document 1: JP 2014-178894 A

SUMMARY OF THE INVENTION

Problems to be Solved by the Invention

In Patent Document 1, simply controlling an operation mode in a case of including a mode in which the app is operated solely and a mode in which the app is operated in cooperation is not described or considered.

In consideration of the problem described above, an object of the present invention is to improve convenience of use in operation mode control of an app that performs a cooperative operation with a plurality of information terminal devices.

Solutions to Problems

According to an example of the present invention, an information terminal device executing an application is configured to activate the application by selecting between a solo operation mode and a cooperative operation mode, depending on a form of an activation instruction for the application.

Effects of the Invention

According to the present invention, it is possible to provide an information terminal device that is capable of improving convenience of use in operation mode control of an app that performs a cooperative operation, and an application operation mode control method of the same.

MODE FOR CARRYING OUT THE INVENTION

Hereinafter, Examples of the present invention will be described by using the drawings.

Example 1

Figure 1:
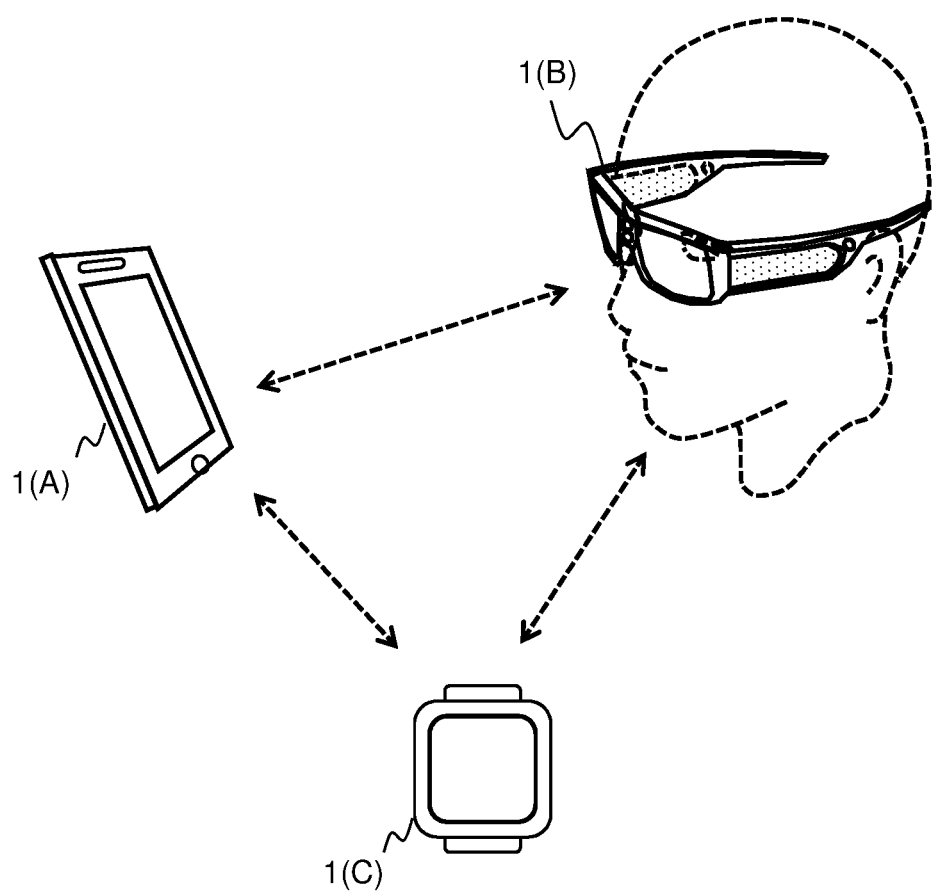
FIG. 1 is a configuration schematic view of an information processing system that performs a cooperative operation with a plurality of information terminal devices in Example 1.

FIG. 1 is a configuration schematic view of an information processing system that performs a cooperative operation with a plurality of information terminal devices in this Example. In FIG. 1, the information processing system that performs the cooperative operation includes a smart phone (hereinafter, referred to as smartphone) 1(A), an HMD 1(B), and a smart watch 1(C), as the plurality of information terminal devices. Such information terminal devices are connected through communication such as Wi-Fi (Registered Trademark) or Bluetooth (Registered Trademark), and information terminal devices required for the cooperation are selected and cooperated.

Figure 2:
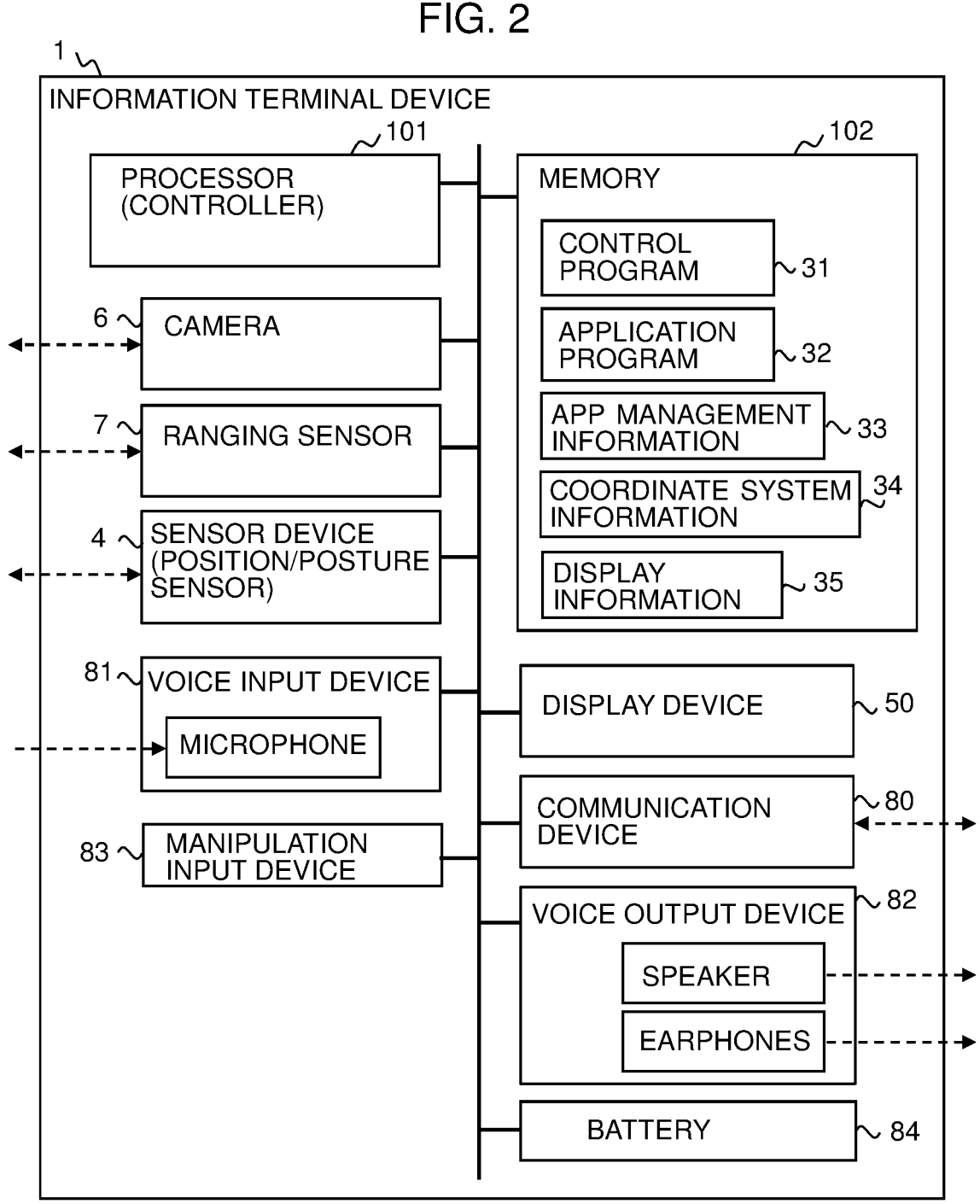
FIG. 2 is a block diagram illustrating a hardware configuration of the information terminal device in Example 1.

FIG. 2 is a block diagram illustrating a hardware configuration of an information terminal device 1 in this Example. In FIG. 2, the information terminal device 1 includes a processor (controller) 101, a memory 102, a sensor device 4, a camera 6, a ranging sensor 7, a display device 50, a communication device 80, a voice input device 81, a voice output device 82, a manipulation input device 83, and a battery 84.

The processor 101 is a controller that controls the entire information terminal device 1 in accordance with a predetermined operation program. That is, the processor analyzes and executes the operation program for attaining each of functions, and thus, attains each of the functions by software.

The memory 102 stores a control program 31 for controlling the operation of the information terminal device 1, an application program 32, app management information 33, coordinate system information 34, and display information 35.

The sensor device 4 is a sensor group for detecting the position or the posture of the information terminal device 1. The sensor device 4, for example, includes a global positioning system (GPS) receiving unit, a geomagnetic sensor unit, an acceleration sensor unit, a gyroscope sensor unit, and the like. Depending on such sensor groups, the position, the inclination, the direction, the motion, or the like of the information terminal device 1 can be detected. In addition, the information terminal device 1 may further include other sensors such as an illuminance sensor, an altitude sensor, and a proximity sensor.

The camera 6 is a camera unit that converts light input from a lens into an electrical signal by using an electronic device such as a charge coupled device (CCD) or a complementary metal oxide semiconductor (CMOS) sensor, and thus, inputs image data of the environment or a target.

The ranging sensor 7 is a sensor that is capable of grasping a distance to each point of the target, and for example, in a case where the ranging sensor 7 is a phase difference type (phase shift type) sensor, the target is irradiated with a plurality of modulated laser light rays, and a distance to the target is measured by a phase difference of a returning diffuse reflection component.

The display device 50 is a display that provides the image data to a user of the information terminal device 1, and is a liquid crystal display device, for example, a display device of a transmissive display using a laser projector, a half mirror, or the like.

The communication device 80 is a communication unit including a LAN (Wi-Fi) communication unit, a mobile communication unit, a Bluetooth communication unit, or the like.

The voice input device 81 is a microphone, and converts the voice or the like of the user into voice data and inputs the voice data. The voice output device 82 is a speaker or earphones, and outputs voice information or the like required for the user.

The manipulation input device 83 is an instruction input unit that is a user manipulation interface and inputs a manipulation instruction to the information terminal device 1, and includes SWs, a manipulation key such as a power key or a volume key, and a touch sensor such as a touch pad. Note that, the manipulation input device 83 may further include other manipulation devices.

Figure 3:
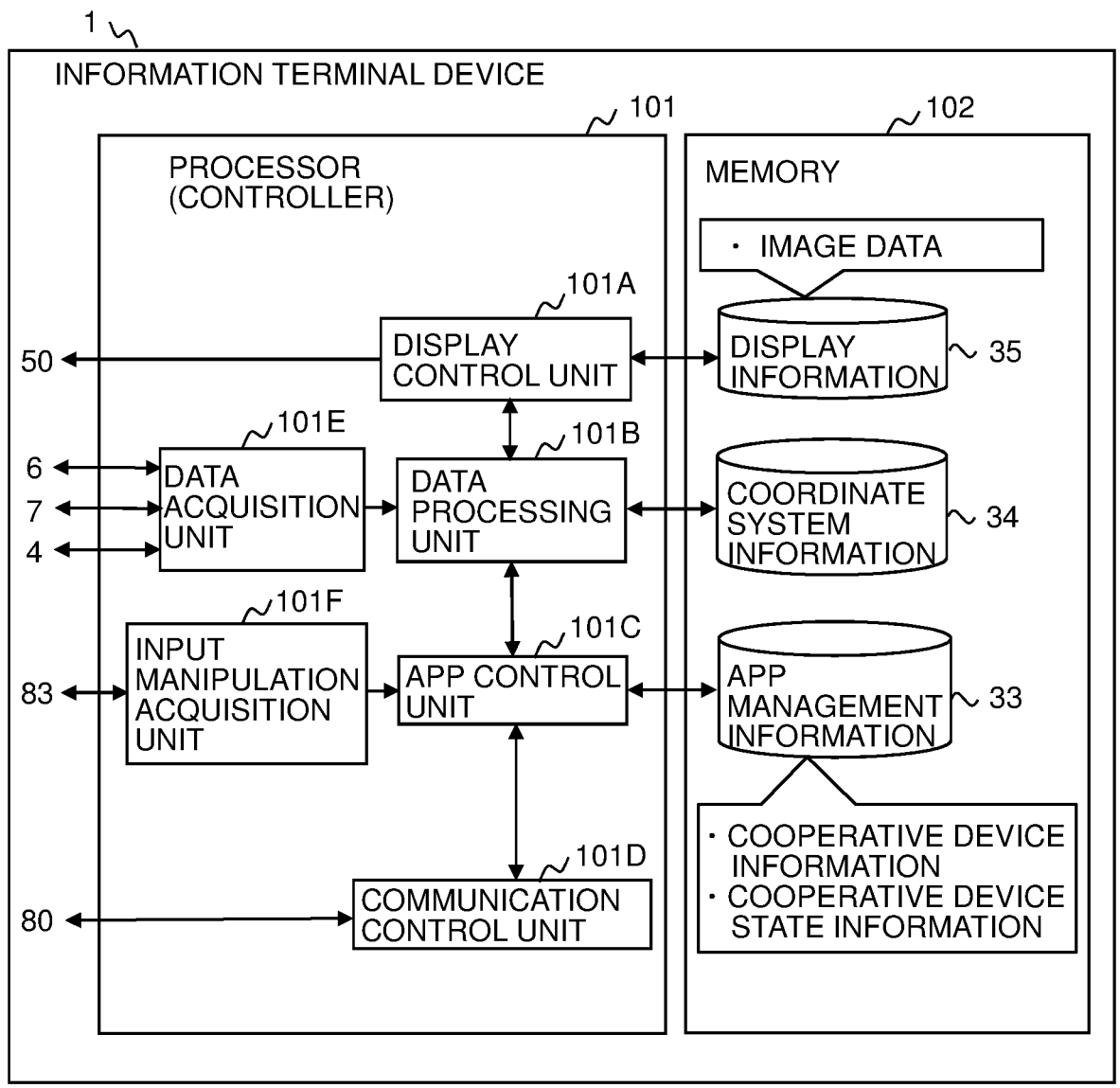
FIG. 3 is a function configuration diagram of the information terminal device in Example 1.

FIG. 3 is a function configuration diagram of the information terminal device in this Example. In FIG. 3, in the processor 101, the functions that are executed by the operation program to be decompressed are described with respect to each function. That is, the processor 101 includes a display control unit 101A performing display control of the display device 50 by using the display information 35 on the memory 102, a data processing unit 101B performing data processing by using the coordinate system information 34 on the memory 102, an app control unit 101C performing app control by using the app management information 33 on the memory 102, a communication control unit 101D controlling the communication device 80, a data acquisition unit 101E acquiring data from the sensor device 4, the camera 6, and the ranging sensor 7, and an input manipulation acquisition unit 101F acquiring data from the manipulation input device 83.

In this Example, in the information terminal device executing an app, the app is activated by selecting between a solo operation mode and a cooperative operation mode, depending on the form of an activation instruction for the app. Specifically, as the form of the activation instruction for the app, an activation instruction for the sole operation or an activation instruction for the cooperative operation are separated in accordance with whether or not the activation instruction is an activation instruction in a state where an information terminal device to be a cooperation target is selected.

Figure 4A:
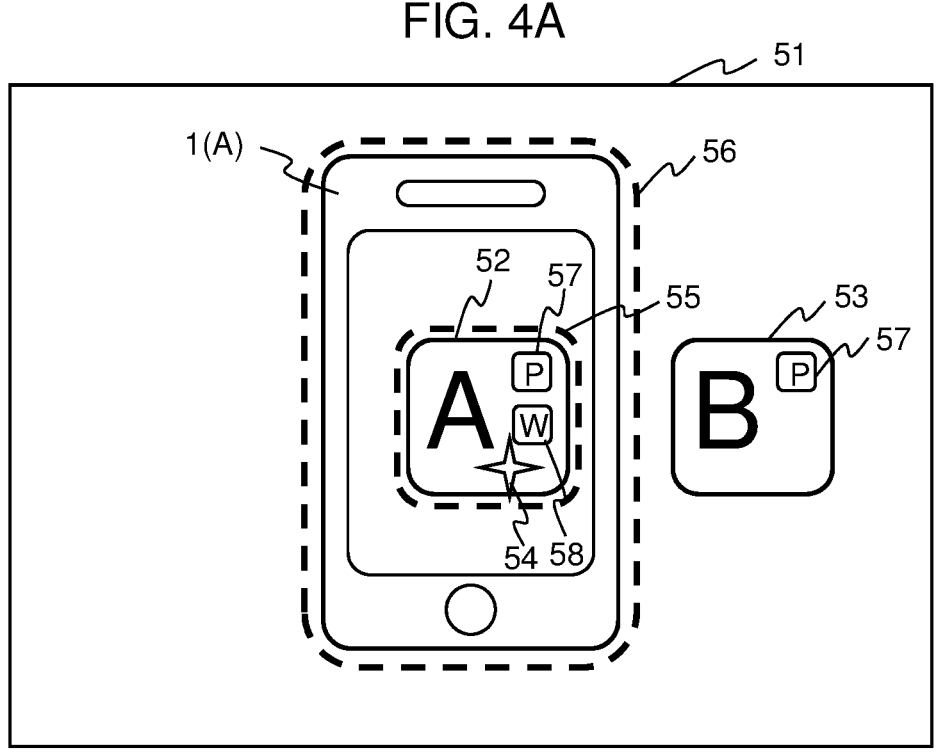
FIG. 4A and FIG. 4B are explanatory diagrams illustrating a processing outline of operation mode selection in Example 1.
Figure 4B:
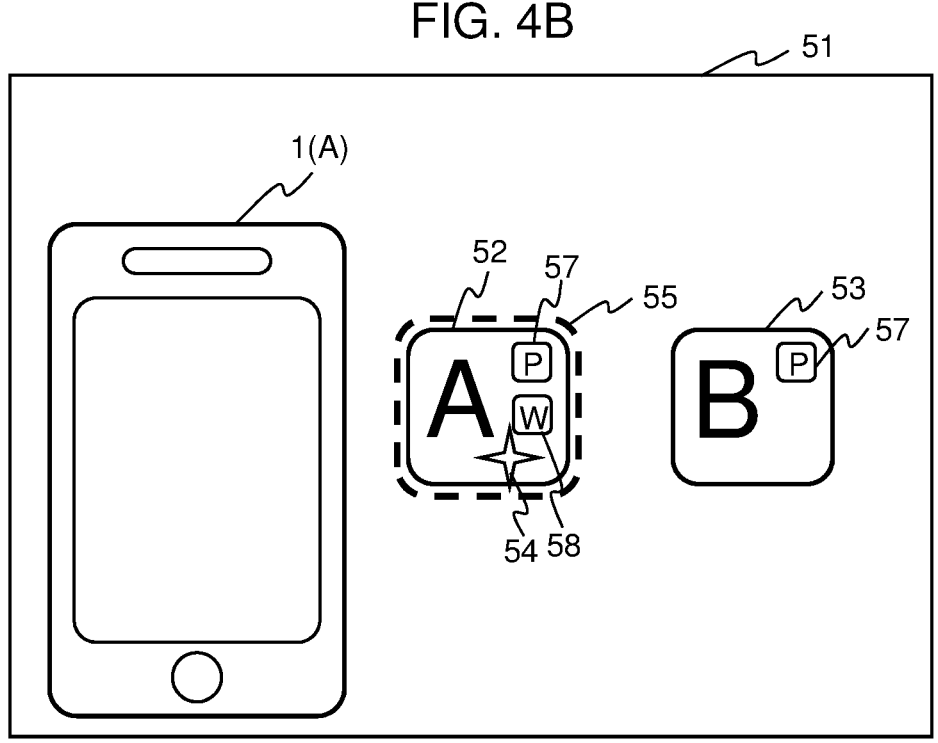

FIG. 4A and FIG. 4B are explanatory diagrams illustrating a processing outline of operation mode selection in this Example. FIG. 4A and FIG. 4B depict a display screen 51 of the HMD and illustrates a visual field of the HMD. On the display screen 51, a generated image (AR object) of augmented reality (AR) using a computer is displayed by being superimposed on a video of the real space. The video of the real space is the smartphone 1(A), and the AR object is app icons 52 and 53 of the HMD.

FIG. 4A illustrates the selection of the cooperative operation mode between the HMD and the smartphone as the operation mode of the app, and FIG. 4B illustrates the selection of the solo operation mode of the HMD.

In FIG. 4A, a cross is a pointer 54 of the HMD, and in a case of selecting the app icon 52 by the pointer 54 in a state where an image of the smartphone 1(A) overlaps with the app icon 52, an app corresponding to the app icon 52 is selected as the cooperative operation mode with the smartphone. Note that, a dotted line 55 around the app icon 52 is an AR object representing a state in which the pointer 54 is aligned with the app icon 52, and for example, the color of the app icon 52 may be changed instead of the dotted line. In addition, similarly, a dotted line 56 around the smartphone 1(A) is an AR object representing that the app icon 52 overlaps with the image of the smartphone 1(A).

Note that, in the app icons 52 and 53, P and W illustrated on the upper right represent the information terminal device to be the cooperation target of the app corresponding to the app icons 52 and 53. P 57 illustrates a smart phone, and W 58 illustrates a smart watch. In addition, the position of the smartphone is detected by image recognition of a camera image of the HMD.

In FIG. 4B, the app icon 52 is selected by the pointer 54 in a state where the image of the smartphone 1(A) does not overlap with the app icon 52, and thus, the app corresponding to the app icon 52 is in the solo operation mode of the HMD.

Figure 5:
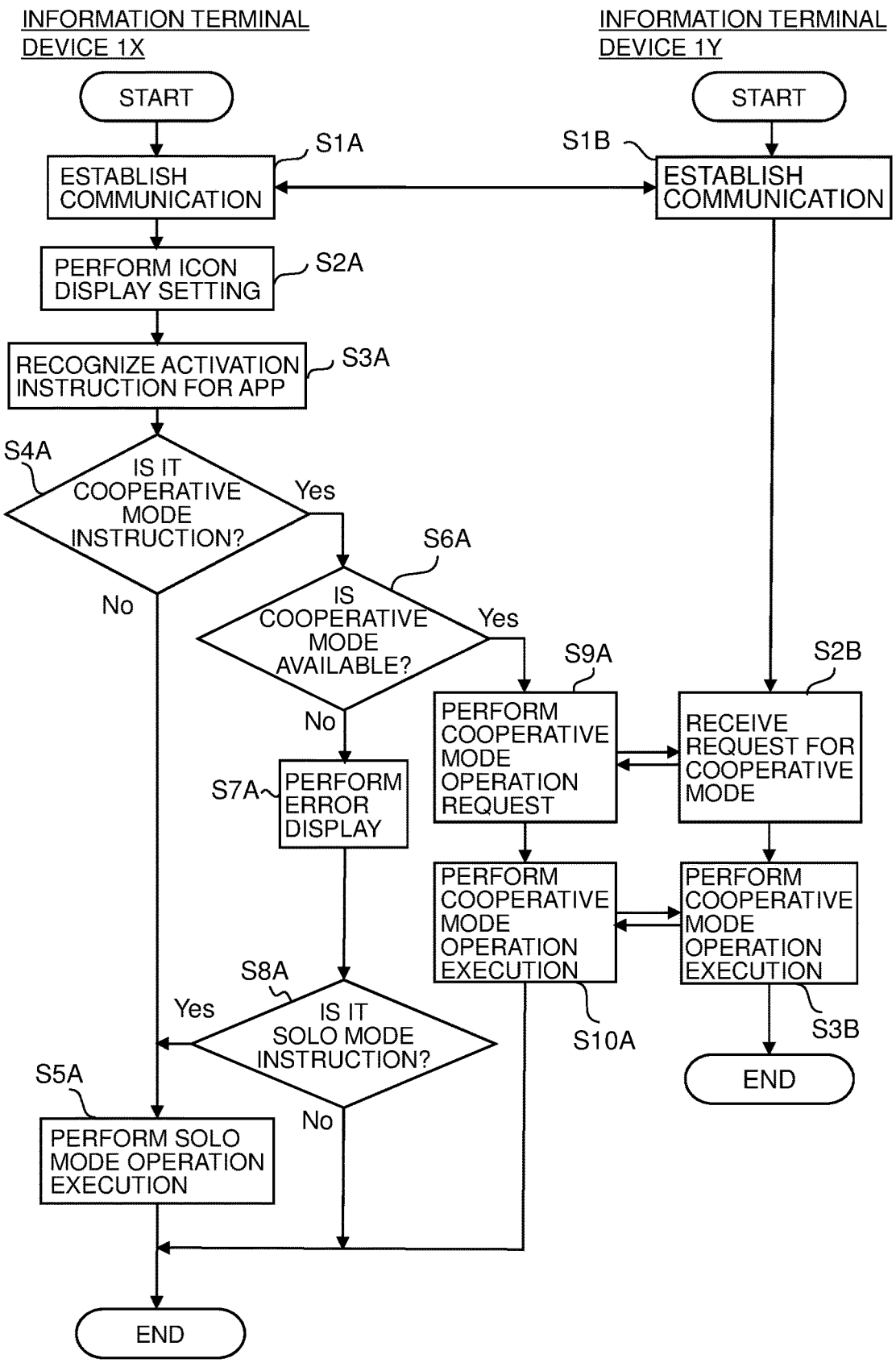
FIG. 5 is a processing flowchart of the operation mode selection in Example 1.

FIG. 5 is a processing flowchart of the operation mode selection in this Example. FIG. 5 is a processing flowchart corresponding to FIG. 4A and FIG. 4B, in which an information terminal device 1X is the HMD, and an information terminal device 1Y is the smartphone.

Figure 6:
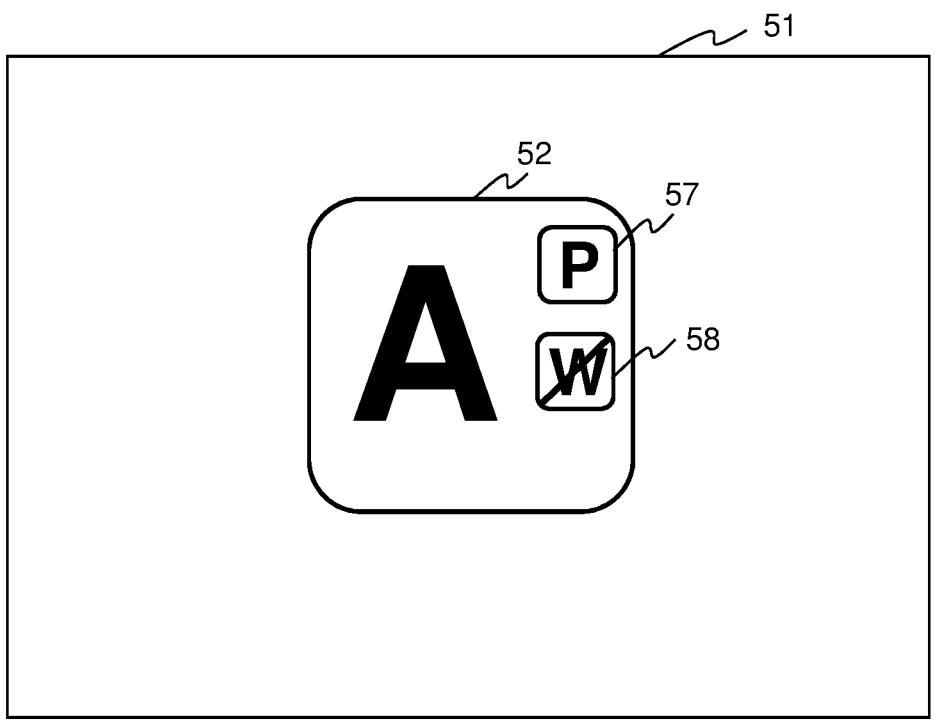
FIG. 6 is a display example of an app icon in Example 1.

In FIG. 5, first, in steps S1A and S1B, communication between the information terminal devices to be the cooperation target is established through communication such as Bluetooth. That is, communication between the HMD and the smartphone is established. Next, in S2A, the app icon is displayed. That is, as illustrated in FIG. 6, the app icon 52 illustrated in FIG. 4A and FIG. 4B are displayed, in which P 57 representing the smart phone that is the information terminal device to be the cooperation target of the app corresponding to the app icon 52, and W 58 representing the smart watch are displayed. Here, in W 58, a case where the power is OFF or a case where the communication is not capable of being established due to not having the smart watch at hand is illustrated by a slant line. Note that, a color may be changed or a double line may be drawn instead of the slant line.

Then, in S3A, as the recognition of the activation instruction for the app, whether or not the image of the smartphone overlaps with the app icon 52 is recognized when the app icon 52 is selected by the pointer 54, and in S4A, in a case where the image of the smartphone does not overlap with the app icon 52, the process proceeds to S5A, and the app corresponding to the app icon 52 is executed as the solo operation mode.

Figure 7:
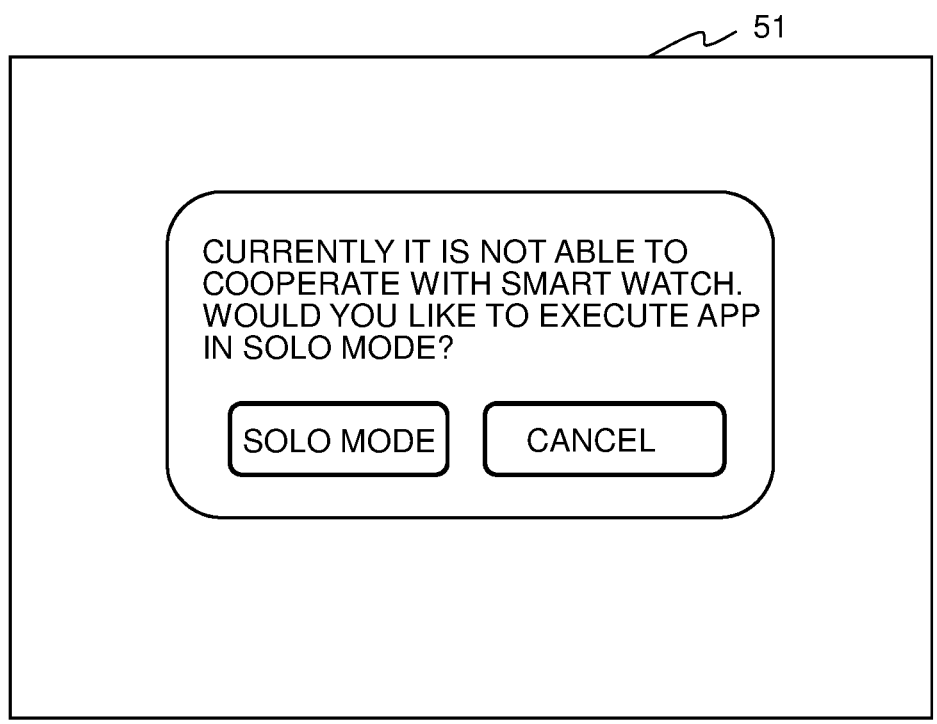
FIG. 7 is an error display example in Example 1.

On the other hand, in S4A, in a case where the image of the smartphone overlaps with the app icon 52, the app is executed as the cooperative operation mode, and the process proceeds to S6A. In S6A, it is determined whether or not the information terminal device selected as the cooperation target can be cooperative. For example, as illustrated in FIG. 6, in a case of selecting the smart watch W 58 in which the communication is not capable of being established, as the cooperation target, that is, in a case of selecting the app icon 52 in a state where the image of the smart watch overlaps with the app icon 52, the cooperation is not available, the process proceeds to S7A, and error display is performed. FIG. 7 is an example of the error display, in which it is checked whether or not the app is executed in the solo operation mode, together with a message indicating that the cooperation is not available. Then, in S8A, in a case where there is a solo operation mode instruction, the process proceeds to S5A, and the solo operation mode is executed. In addition, in a case where there is no solo operation mode instruction, the process ends. Note that, in a case of selecting cooperative execution with an information terminal device that is not available in the cooperation, the app may be activated solely without performing the error display, or the app may be activated solely without performing checking by the error display displaying that the cooperation is not available. Further, a plurality of processing methods in a case of selecting the cooperative execution when the cooperation is not available may be prepared, and which processing method is to be performed may be set in advance in the information terminal device by user setting.

Then, in S6A, in a case where the cooperation is available, the process proceeds to S9A, and in S9A, a request for the cooperative mode operation is performed to the information terminal device 1Y of the cooperation destination, the information terminal device 1Y side receives the request in S2B, and the operation of the cooperative operation mode is executed in each of S10A of the information terminal device 1X and S3B of the information terminal device 1Y.

As described above, in this Example, in the information terminal device executing the app, the activation instruction for the solo operation and the activation instruction for the cooperative operation are separated in accordance with whether or not the activation instruction for the app is performed as a state where the information terminal device of the cooperation target is selected by overlapping the information terminal device of the cooperation target with the app icon on the display. Accordingly, intuitive control of the operation mode can be simply attained, and the convenience of use in an activation operation of the app can be improved.

Example 2

In Example 1, as the form of the activation instruction for the app, the activation instruction for the solo operation and the activation instruction for the cooperative operation are separated in accordance with whether or not the app icon is selected in a state where the image of the information terminal device of the cooperation target overlaps with the app icon. In contrast, in this Example, as the form of the activation instruction for the app, an example will be described in which activation according to the solo operation mode and activation according to the cooperative operation mode are separated, depending on the number of consecutive selection actions (the number of clicks, taps, or the like) of the app icon when activating the app at a predetermined time interval or less.

In this Example, for example, in the app icon on the smart phone, single tapping corresponds to the solo operation mode of the smart phone, and double tapping corresponds to the cooperative operation mode with the HMD. Further, triple tapping corresponds to the cooperative operation mode with the smart watch, and consecutive quadruple tapping corresponds to the cooperative operation mode with both of the HMD and the smart watch.

A processing flowchart of operation mode selection in this Example may be identical to that in FIG. 5, and in step S3A of FIG. 5, as the recognition of the activation instruction for the app, when the app icon is selected by the pointer, the solo operation mode and the cooperative operation mode are separated, depending on the number of selections such as clicking. Note that, in a case where the app icon is selected by finger tapping (a thumb and an index finger) instead of the pointer, the solo operation mode and the cooperative operation mode are separated in accordance with the number of taps.

As described above, in this Example, in the information terminal device executing the app, the activation instruction for the solo operation and the activation instruction for the cooperative operation are separated, depending on the number of consecutive selections of the app icon when activating the app. Accordingly, the intuitive control of the operation mode can be simply attained, and the convenience of use in the activation operation of the app can be improved.

Example 3

In Example 1, an instruction for a solo activation or an instruction for a cooperative activation is performed by selecting the app icon on the HMD side that is the information terminal device executing the app. In contrast, in this Example, an example will be described in which the activation instruction for the cooperative operation mode is performed by selecting the app icon to be displayed on the information terminal device of the cooperation target.

Figure 8:
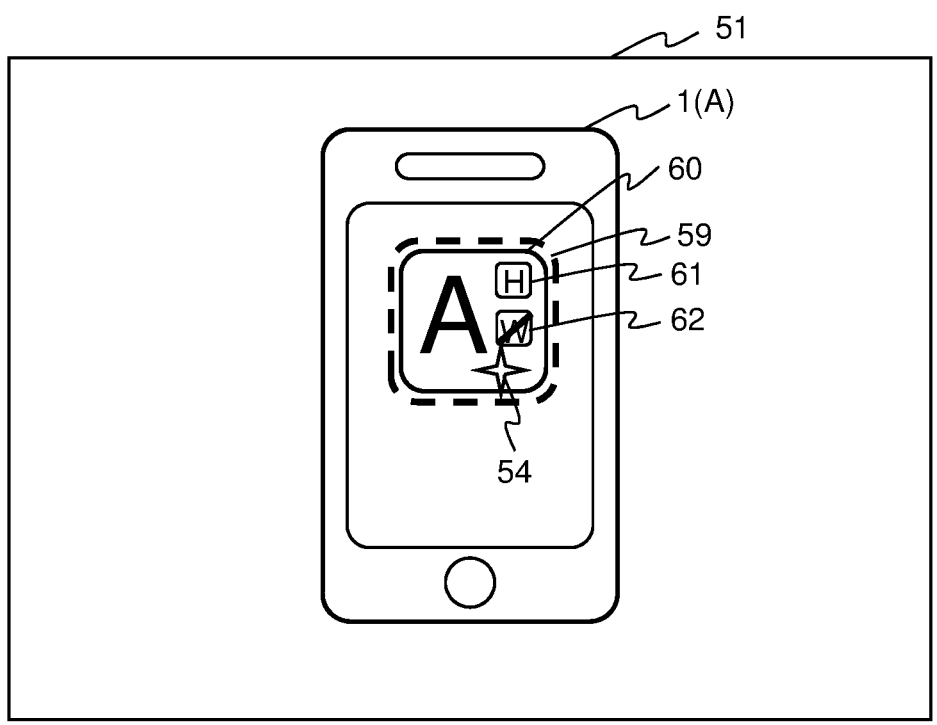
FIG. 8 is an explanatory diagram illustrating a processing outline of operation mode selection in Example 3.

FIG. 8 is an explanatory diagram illustrating a processing outline of operation mode selection in this Example. In FIG. 8, as with FIG. 4A and FIG. 4B, the display screen 51 of the HMD is illustrated, the same reference numerals will be applied to the same configurations as those in FIG. 4A and FIG. 4B, and the description thereof will be omitted. FIG. 8 is different from FIG. 4A and FIG. 4B in that an app icon 60 is the app icon of the smartphone displayed on the smartphone.

In FIG. 8, in a case where the app icon 60 of the smartphone is selected by the pointer 54 of the HMD, an app corresponding to the app icon 60 is selected as a cooperation candidate with the HMD. Note that, a dotted line 59 around the app icon 60 is an AR object of the HMD representing that the app icon 60 is set to a selection candidate by the pointer 54.

Note that, in the app icon 60, H and W illustrated on the upper right represent the information terminal device to be the cooperation target of the app corresponding to the app icon 60. H 61 illustrates a HMD, and W 62 illustrates a smart watch. In addition, in W 62, a state in which the cooperative operation with the smart watch is not available, such as a case were communication is not capable of being established, is illustrated by a slant line. Note that, a color may be changed or a double line may be drawn instead of the slant line. In addition, the app icon on the smartphone is specified by the image recognition of the HMD.

Figure 9:
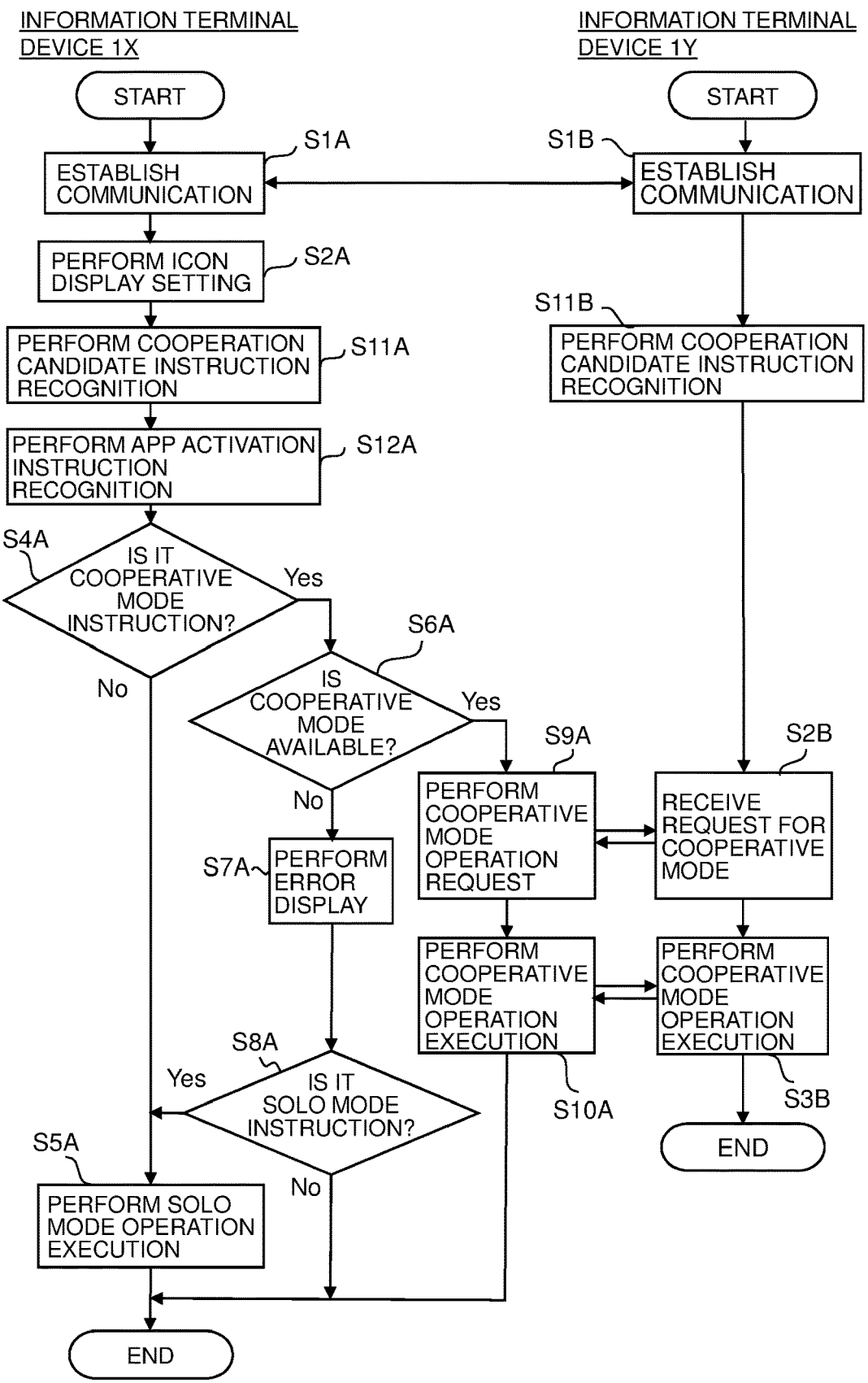
FIG. 9 is a processing flowchart of the operation mode selection in Example 3.

FIG. 9 is a processing flowchart of operation mode selection in this Example. FIG. 9 is a processing flowchart corresponding to FIG. 8, in which the information terminal device 1X is the smartphone, and the information terminal device 1Y is the HMD. In FIG. 9, the same reference numerals will be applied to the same steps as those in FIG. 5, and the description thereof will be omitted. FIG. 9 is different from FIG. 5 in that the information terminal device 1X is the smartphone, the information terminal device 1Y is the HMD, and cooperation candidate instruction recognition S11B, cooperation candidate instruction recognition A11A, and app activation instruction recognition S12A are different.

In FIG. 9, the activation instruction of the user is performed to the smartphone. That is, in step S11B, in a case where the pointer 54 overlaps with the app icon 60 on the smartphone by a user manipulation, the information terminal device 1Y (HMD) recognizes that the app corresponding to the app icon 60 is set to the cooperation candidate by the image recognition. Next, the information terminal device 1Y notifies information of a cooperation target app to the information terminal device 1X (smartphone), and in step S11A, the information terminal device 1X recognizes that the app corresponding to the app icon 60 is set to the cooperation candidate. Next, in step S12A, the information terminal device 1X recognizes the activation instruction for the app by tapping the app icon. After recognizing the activation instruction, in a case where the app with the activation instruction is set to be the cooperation candidate with the information terminal device 1Y, the control of the information terminal device 1X branches to step S6A from step S4A, and in a case where the app is not set to the cooperation candidate, the control branches to step S5A from step S4A. The subsequent flow is identical to the flow in FIG. 5.

In addition, in a case where the information terminal device 1X is the smart watch, the icon becomes small, and thus, in a case of displaying a plurality of icons, there is a problem that an icon to be a target is hidden and is difficult to select. In contrast, as with this Example, in a case where an icon to be a candidate is selected in advance by using the pointer of the HMD, a case in which a shift in a tapping position is within an allowable range set in advance is analyzed as the activation instruction to the app selected by the pointer of the HMD, and thus, icon selection in the information terminal device 1X is facilitated. In this case, even in a case of using such a method for a solo operation, the same effect of improving manipulativeness can be obtained.

In addition, the instruction for the solo activation or the instruction for the cooperative activation may be performed, for example, such that in a case where the selection in the information terminal device 1X is finger tapping, single tapping corresponds to the solo activation, and double tapping corresponds to the cooperative activation, in addition to the app to be the target is set to the cooperation target.

As described above, in this Example, in the information terminal device performing the activation instruction for the app, the activation instruction for the cooperative operation mode is performed on the basis of the fact that the app icon is selected from the information terminal device of the cooperation target, as a cooperation candidate app. Accordingly, the intuitive control of the operation mode can be simply attained, and the convenience of use in the activation operation of the app can be improved.

Example 4

In Example 3, in the information terminal device performing the activation instruction for the app, a cooperative mode operation request (S9A) of the app corresponding to the app icon is performed by the smartphone by selecting the app icon to be displayed on the information terminal device (smartphone) of the cooperation target. In contrast, in this Example, an example will be described in which the cooperative mode operation request of the app is performed by the HMD.

Figure 10:
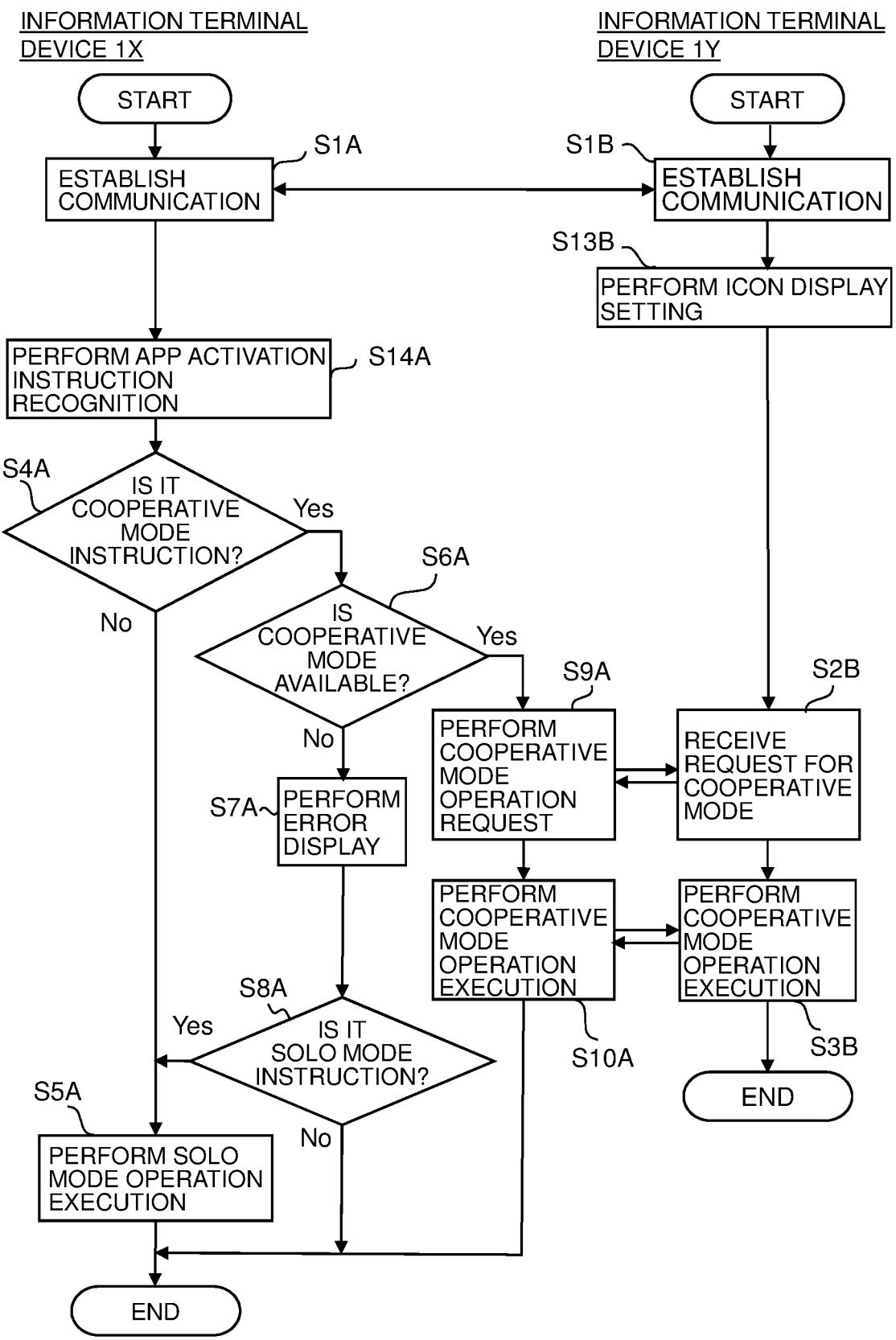
FIG. 10 is a processing flowchart of operation mode selection in Example 4.

FIG. 10 is a processing flowchart of operation mode selection in this Example. In FIG. 10, the same reference numerals will be applied to the same steps as those in FIG. 5, and the description thereof will be omitted. FIG. 10 is different from FIG. 5 in that icon display setting S13B and app activation instruction recognition S14A are different.

In FIG. 10, the information terminal device 1X is the HMD, and the information terminal device 1Y is the smartphone.

In S13B, the smartphone displays the app icon. In S14A, the HMD selects the app icon displayed on the smartphone on the image by the pointer 54 of the HMD, and thus, activates the same app on the HMD.

The mode of the activation may be the solo operation of the HMD, or may be the cooperative operation between the HMD and the smartphone. The selecting between the solo operation and the cooperative operation is identical to that in Example 2.

In addition, in a case where the information terminal device 1Y is the smart watch, the icon becomes small, and thus, in a case of displaying a plurality of icons, there is a problem that the icon is hidden by the finger and is difficult to select. In contrast, as with this Example, in a case of selecting the icon on the HMD side, the icon is easily selected.

As described above, in this Example, in the information terminal device performing the activation instruction for the app, app activation in the cooperative operation mode is performed in the information terminal device performing the activation instruction for the app by selecting the app icon to be displayed on the information terminal device of the cooperation target. Accordingly, the intuitive control of the operation mode can be simply attained, and the convenience of use in the activation operation of the app can be improved.

Example 5

In Examples 1 to 4 described above, the app is activated by selecting between the solo operation mode and the cooperative operation mode, depending on the form of the app activation instruction. In this Example, an example will be described in which the information terminal device desirable to be the cooperation target is selected after the app is activated, and thus, the mode is transitioned to the cooperative operation mode.

Figure 11:
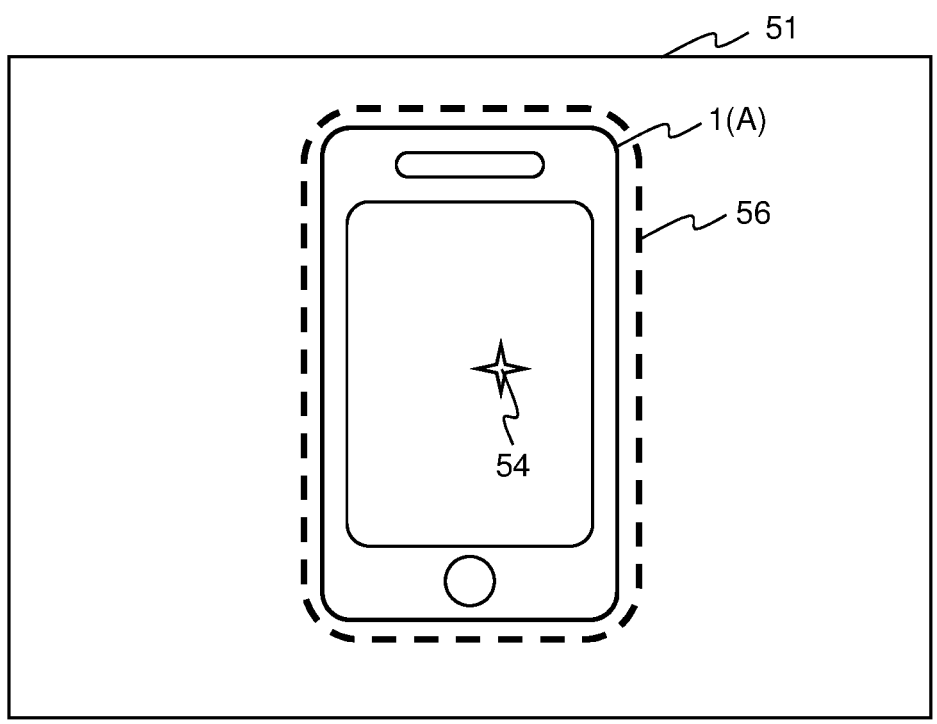
FIG. 11 is an explanatory diagram illustrating a processing outline of operation mode transition in Example 5.

FIG. 11 is an explanatory diagram of a processing outline operation mode transition in this Example. In FIG. 11, as with FIG. 4A and FIG. 4B, the display screen 51 of the HMD is illustrated, the same reference numerals will be applied to the the same configurations as those in FIG. 4A and FIG. 4B, and the description thereof will be omitted. FIG. 11 is different from FIG. 4A and FIG. 4B in that the app on the HMD has been activated.

In FIG. 11, in order to select the information terminal device desirable to be the cooperation target after the app is activated, in a case where the pointer 54 of the HMD overlaps with the image of the smartphone 1(A), the app that has been activated is selected as the cooperative operation mode with the smartphone. Note that, the dotted line 56 around the smartphone 1(A) is an AR object of the HMD representing that smartphone 1(A) is set to the selection candidate.

As a usage example of this Example, for example, in the HMD, simple processing such as displaying a certain AR object and adjusting the position is sufficiently operated in the solo operation mode of the HMD, but in a case of performing advanced editing, such as a case where the AR object is desirable to be modified, a case can be considered in which the app is activated in the cooperative operation mode in the smartphone with a high input function, and an input manipulation is performed by using the smartphone, and thus, the manipulation is facilitated.

Figure 12:
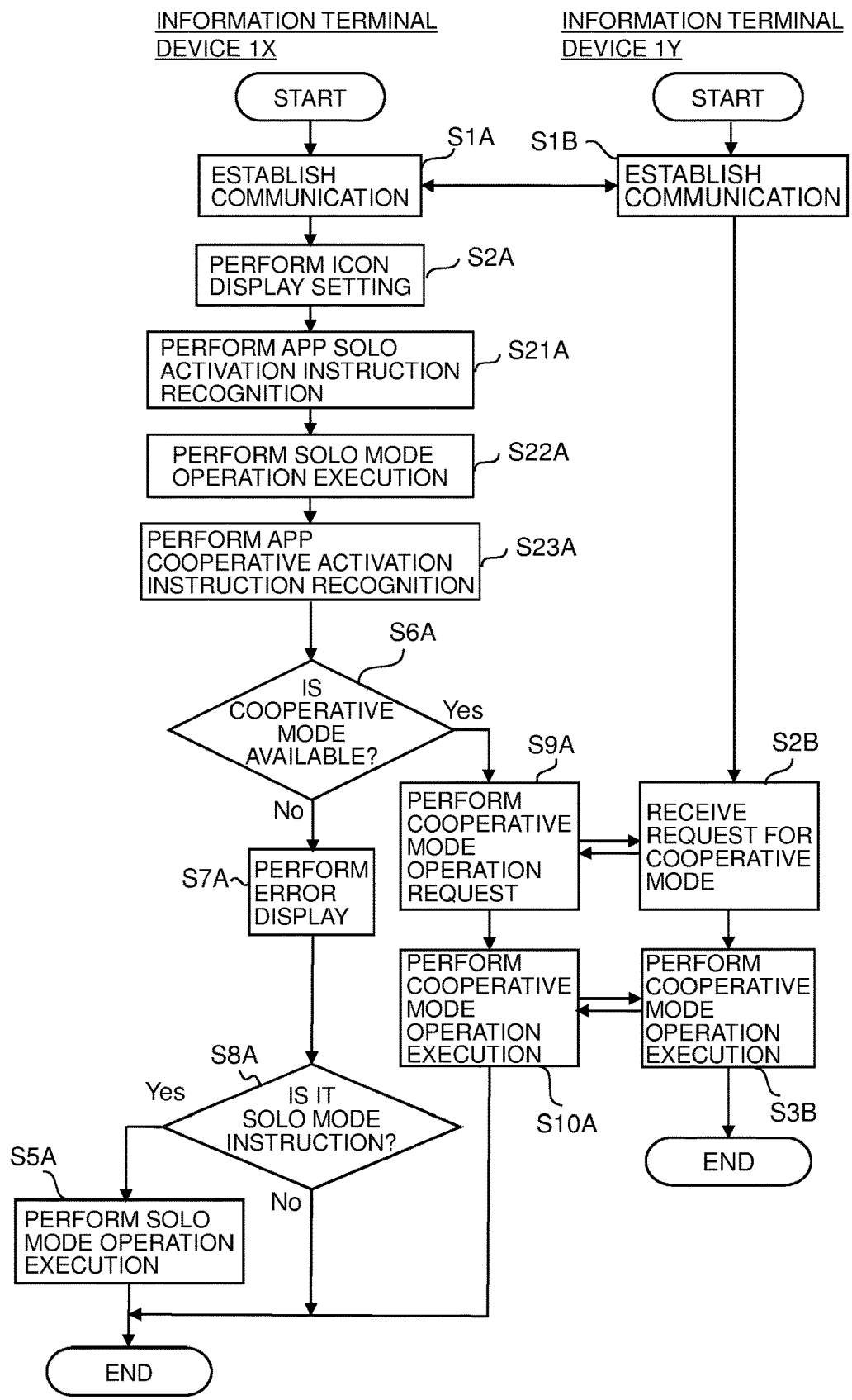
FIG. 12 is a processing flowchart of operation mode selection in Example 5.

FIG. 12 is a processing flowchart of operation mode selection in this Example. In FIG. 12, the same reference numerals will be applied to the same steps as those in FIG. 5, and the description thereof will be omitted. FIG. 12 is different from FIG. 5 in that app solo activation instruction recognition S21A, solo mode operation execution S22A, and app cooperative activation instruction recognition S23A are different.

In FIG. 12, the information terminal device 1X is the HMD, the app solo activation instruction is recognized in S21A, and the solo mode operation is executed in S22A. Then, in the app cooperative activation instruction recognition S23A, in a case where the pointer 54 of the HMD overlaps with the image of the smartphone 1(A), it is recognized that the smartphone 1(A) is selected, which is recognized as the cooperative operation mode instruction between the HMD and the smartphone 1(A), and the process proceeds to S6A.

As described above, in this Example, the information terminal device desirable to be the cooperation target is selected after the app is activated, and thus, the mode can be transitioned to the cooperative operation mode with the information terminal device, the intuitive control of the operation mode can be simply attained, and the convenience of use can be improved.

Example 6

In Example 5, the mode is transitioned to the cooperative operation mode in a state where the information terminal device desirable to cooperate with overlaps with the pointer of the HMD. In contrast, in this Example, an example will be described in which the mode is transitioned to the cooperative operation mode by detecting that the information terminal device desirable to cooperate with overlaps with the AR object displayed on the HMD, instead of the pointer.

Figure 13:
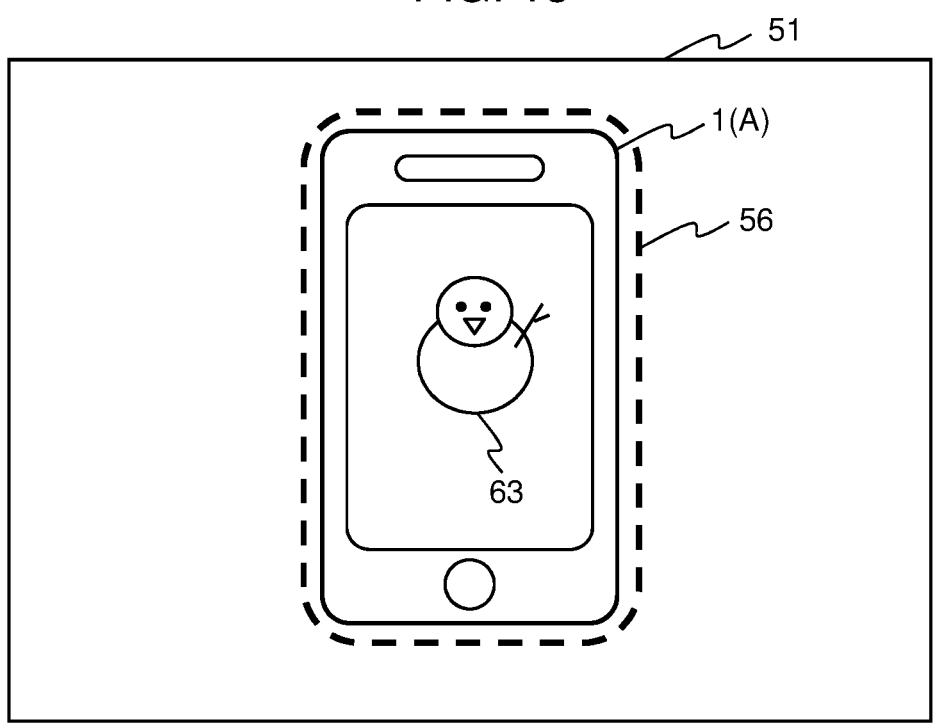
FIG. 13 is an explanatory diagram illustrating a processing outline of operation mode transition in Example 6.

FIG. 13 is an explanatory diagram illustrating a processing outline of operation mode transition in this Example. In FIG. 13, the same reference numerals will be applied to the same configurations as those in FIG. 11, and the description thereof will be omitted. FIG. 13 is different from FIG. 11 in that the app that has been activated is selected as the cooperative operation mode with the smartphone in a case where the image of the smartphone 1(A) overlaps with an AR object 63 displayed on the HMD, instead of the pointer 54 of the HMD.

According to this Example, regardless of the position of the pointer of the HMD, for the app displaying the AR object, the information terminal device desirable to cooperate with can be activated as the cooperative operation mode, and the cooperative operation can be executed. Accordingly, for example, in a case where the processing of the AR object is desirable to be performed, as with this Example, in a case where the smartphone is activated in the cooperative operation mode by detecting that the AR object overlaps with the information terminal device desirable to cooperate with, the AR object desirable to be subjected to a processing manipulation can be specified by the smartphone, and thus, there is an effect that processing with respect to the AR object can be immediately started.

Note that, the cooperative operation mode may not be activated by one overlapping, but the cooperative operation mode may be activated by consecutive double overlapping.

Example 7

In this Example, a case will be described in which the app is activated in advance in the solo operation mode by the smartphone.

Figure 14A:
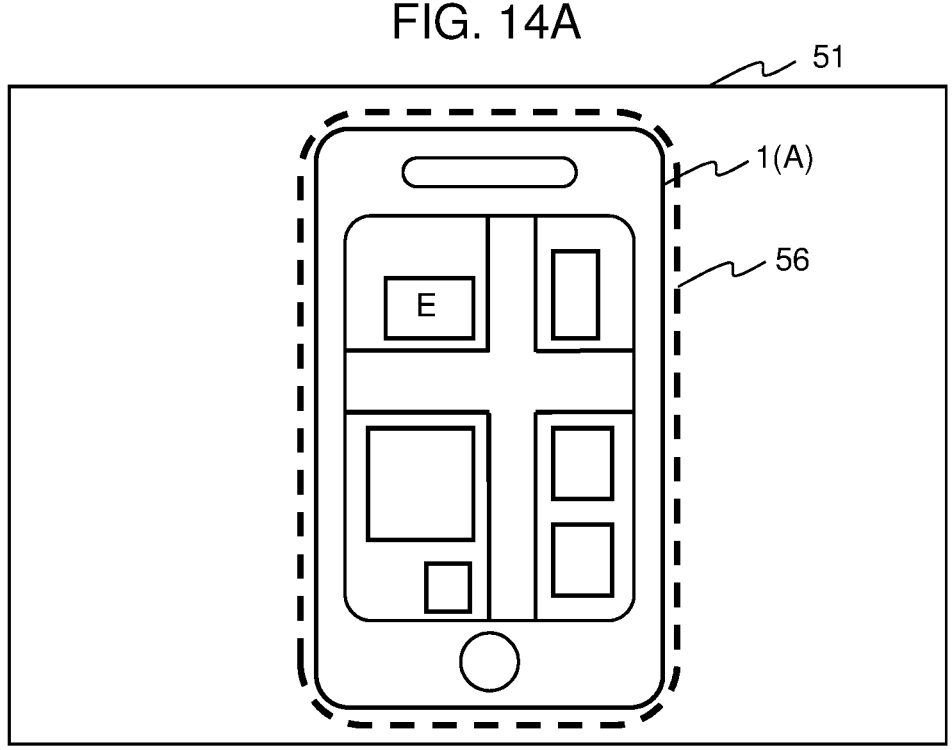
FIG. 14A and FIG. 14B are explanatory diagrams illustrating a processing outline of operation mode transition in Example 7.
Figure 14B:
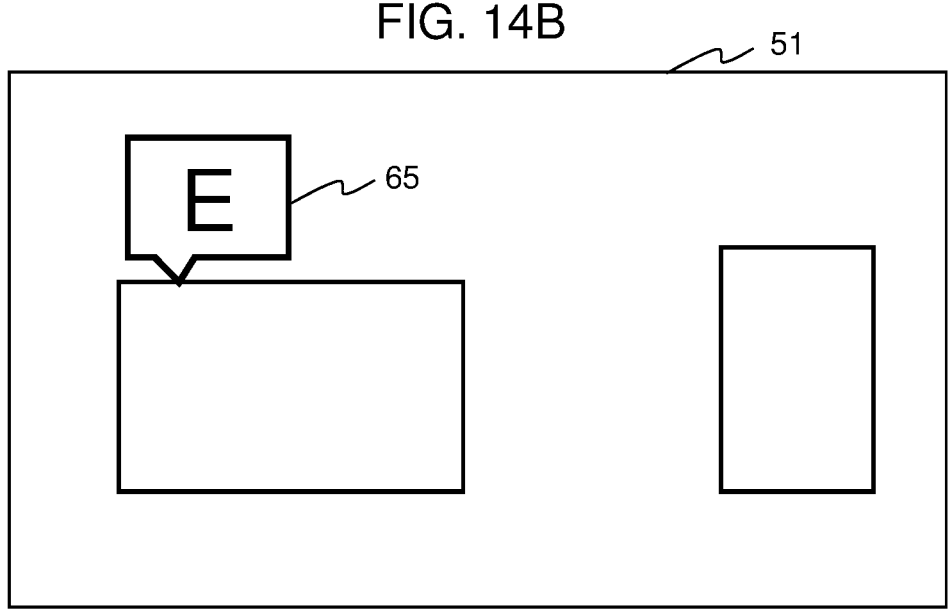

FIG. 14A and FIG. 14B are explanatory diagrams illustrating a processing outline of operation mode transition in this Example. In FIG. 14A and FIG. 14B, the same reference numerals will be applied to the same configurations as those in FIG. 11, and the description thereof will be omitted. In FIG. 14A, a map app is activated by the smartphone 1(A), and in a case where the smartphone is manipulated and a building of "E" is tapped in a state where the user wears the HMD, the HMD is recognized by the camera, and the app in the HMD is activated in the cooperative operation mode. The operation in the HMD, for example, as illustrated in FIG. 14B, is an operation in which an enlarged image of the building "E" in the external world is displayed, and the AR object 65 is superimposed.

Note that, the dotted line 56 around the smartphone 1(A) is an AR object representing that the HMD detects the line of sight, and recognizes and selects the information terminal device of the cooperation target in a case where there is the information terminal device.

In addition, in the manipulation of the app in the smartphone, a manipulation of activating the app of the HMD in the cooperative operation mode when the cooperation is available may be limited. For example, the app of the HMD may not be activated by scrolling, the app of the smartphone may be operated solely by single tapping, and the app of the HMD may be activated by double tapping.

According to this Example, in a case where the app is activated in the solo operation mode by the smartphone, the manipulation of the smartphone is captured in a state where the user wears the HMD, and thus, the app in the HMD can be activated and executed in the cooperative operation mode.

Example 8

In this Example, an example will be described in which the information terminal device other than the information terminal device in which the app is executed solely performs the cooperative operation instruction.

Figure 15:
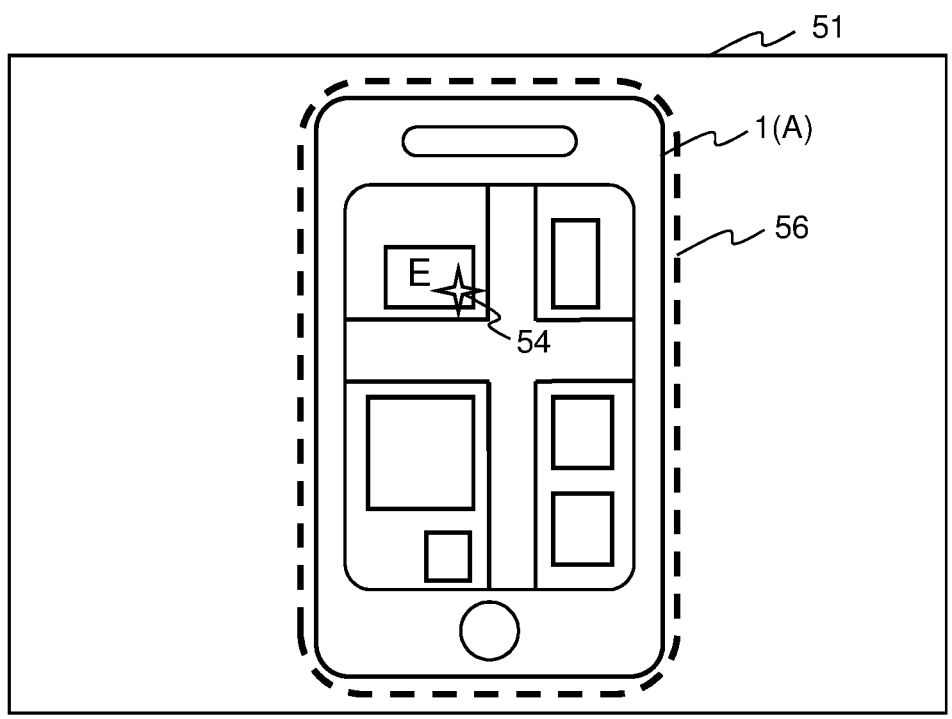
FIG. 15 is an explanatory diagram illustrating a processing outline of operation mode transition in Example 8.

FIG. 15 is an explanatory diagram illustrating a processing outline of operation mode transition in this Example. In FIG. 15, the same reference numerals will be applied to the same configurations in FIG. 11, and the description thereof will be omitted. In FIG. 15, in a case where the pointer 54 of the HMD is aligned with the building "E" and the cooperative operation instruction is issued while the map app is being executed by the smartphone 1(A), the cooperative operation with the smartphone is started, and the same operation as that in Example 7 is performed.

Figure 16:
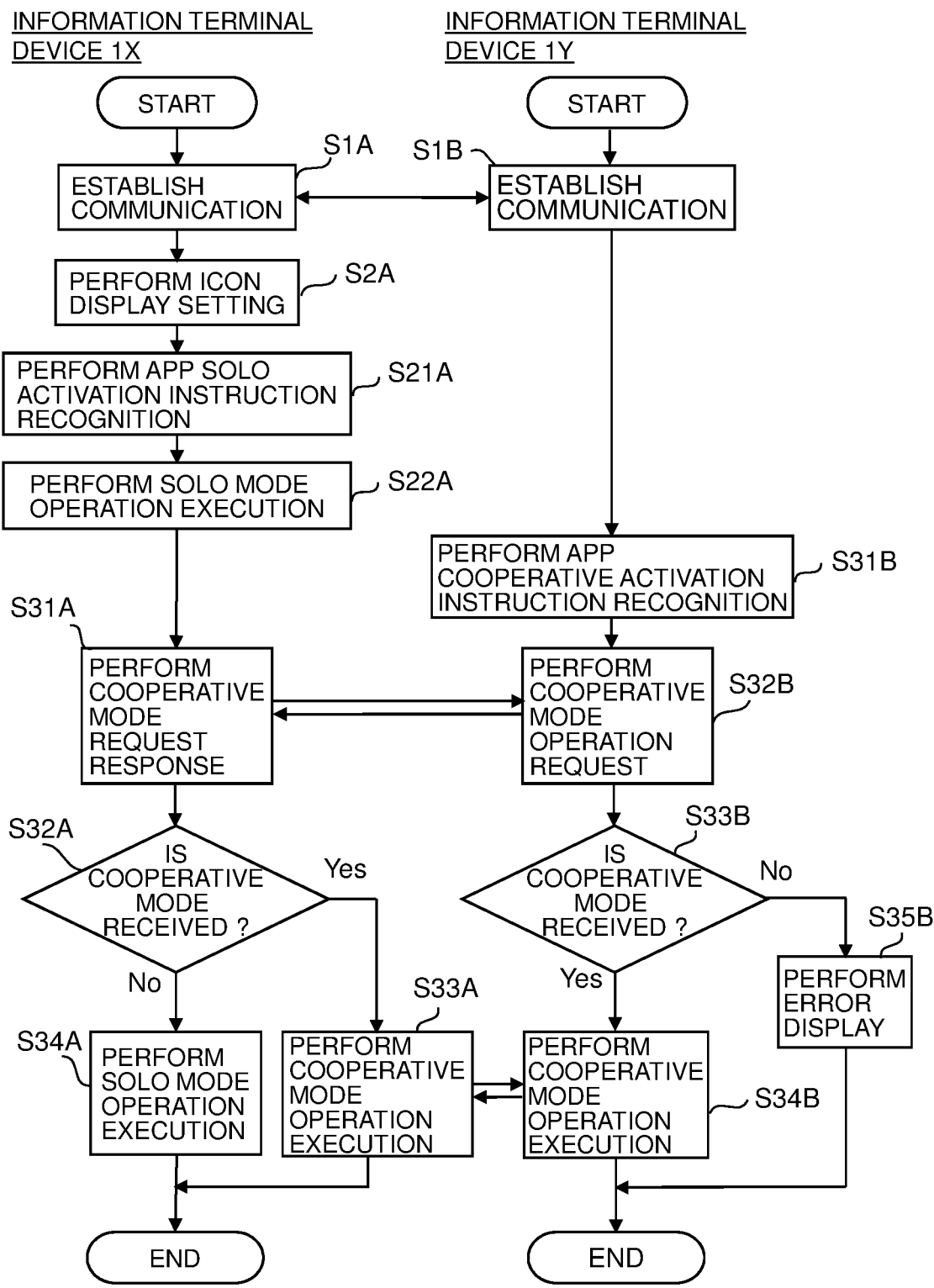
FIG. 16 is a processing flowchart of operation mode selection in Example 8.

FIG. 16 is a processing flowchart of operation mode selection in this Example. In FIG. 16, the same reference numerals will be applied to the same steps as those in FIG. 12, and the description thereof will be omitted. FIG. 16 is different from FIG. 12 in that the information terminal device 1X is the smartphone, the information terminal device 1Y is the HMD, and processing subsequent to cooperative request response S31A in the information terminal device 1X and processing subsequent to app cooperative activation instruction recognition S31B in the information terminal device 1Y are different.

In FIG. 16, the HMD aligns the pointer with an app screen of the smartphone to recognize the activation instruction for the cooperation of the app, on the basis of the premise that the smartphone executes the solo mode operation in step S22A, in step S31B, and the cooperative mode operation request is performed to the smartphone of the information terminal device 1X in S32B, and the process proceeds to S33B. The smartphone receives the request in S31A, and the process proceeds to S32A. In S32A, in a case where the cooperative operation is not available due to a reason such as an app in which the cooperative operation is not available, the process proceeds to S34A, and the smartphone continues the solo mode operation. In S32A, in a case where the reception of the cooperative operation mode is OK, the process proceeds to S33A, and the operation of the cooperative operation mode is executed.

In addition, in S33B, as with S32A, in a case where the cooperative operation is not available due to a reason such as an app in which the cooperative operation is not available, the process proceeds to S35B, and the HMD performs the error display. In S33B, in a case where the reception of the cooperative operation mode is OK, the process proceeds to S34B, and the operation of the cooperative operation mode is executed.

According to this Example, in a case where the app is activated in the solo operation mode, the information terminal device other than the information terminal device in which the app is executed solely is capable of performing the cooperative operation instruction.

Example 9

In this Example, a specific example in a case where a certain information terminal device solely executes the app, and then, activates the cooperative operation mode will be described.

Figure 17A:
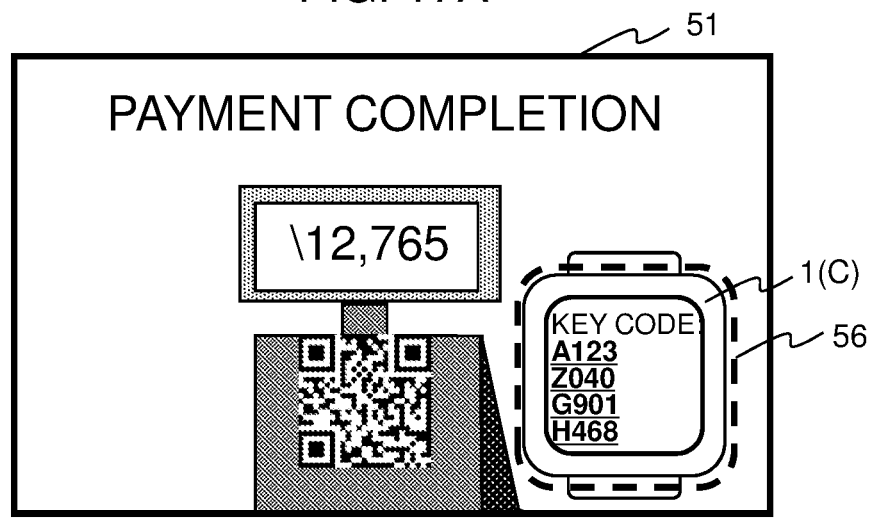
FIG. 17A and FIG. 17B are schematic views illustrating cooperative operation mode transition in Example 9.
Figure 17B:
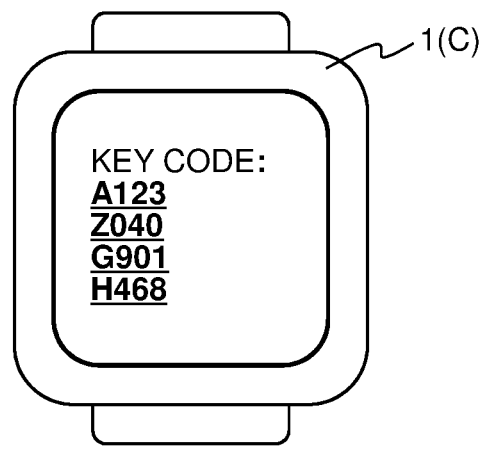

FIG. 17A and FIG. 17B are schematic views illustrating cooperative operation mode transition in this Example. FIG. 17A and FIG. 17B illustrate an example in which QR code (Registered Trademark) payment is performed in the HMD, in which FIG. 17A is the display screen 51 of the HMD and illustrates the visual field of the HMD. In addition, FIG. 17A displays letters of "Payment Completion" and a key code to be the proof of the payment completion at a time point when payment is completed. In such a state, in a case where the smart watch 1(C) is in the visual field of the HMD, and the selection operation is performed in the HMD or the selection operation is performed in the smart watch by tapping the smart watch, the same app is also activated in the cooperative operation mode in the smart watch, and as illustrated in FIG. 17B, the key code is also displayed on the smart watch. In this Example, in a case of the HMD that is not capable of presenting the information to the outside, it is possible to present the key code to a store staff with the smart watch by such a cooperative operation.

Note that, the dotted line 56 around the smart watch 1(C) is an AR object representing that the HMD recognizes and selects the smart watch of the cooperation target.

In addition, in FIG. 17A, the position of the smart watch within the visual field of the HMD overlaps with the position of the key code that is information desirable to be displayed on the watch, but in a situation where the app is executed, in a case where the information to be displayed on the smart watch is set, the position of the smart watch may be within the visual field of the HMD. On the contrary, in a case where there is a plurality of information pieces desirable to be displayed on the smart watch, as illustrated in FIG. 17A, the selection operation may be performed by aligning the position of the smart watch with the position in which the information is displayed.

Example 10

In this Example, an example will be described in which in one information terminal device, an app to cooperate with may be an app specializing in display, in Example 9.

In FIG. 17A and FIG. 17B, the app that is activated on the smart watch side is an app for displaying display content of the HMD on the smart watch, and is capable of cooperating with various types of apps on the HMD side.

In this case, as illustrated in FIG. 17A, in a case where a part desirable to be displayed on the smart watch in the information to be displayed on the HMD overlaps with the appearance of the smart watch, and the selection operation is performed, the information is displayed on the smart watch as illustrated in FIG. 17B.

Figure 18A:
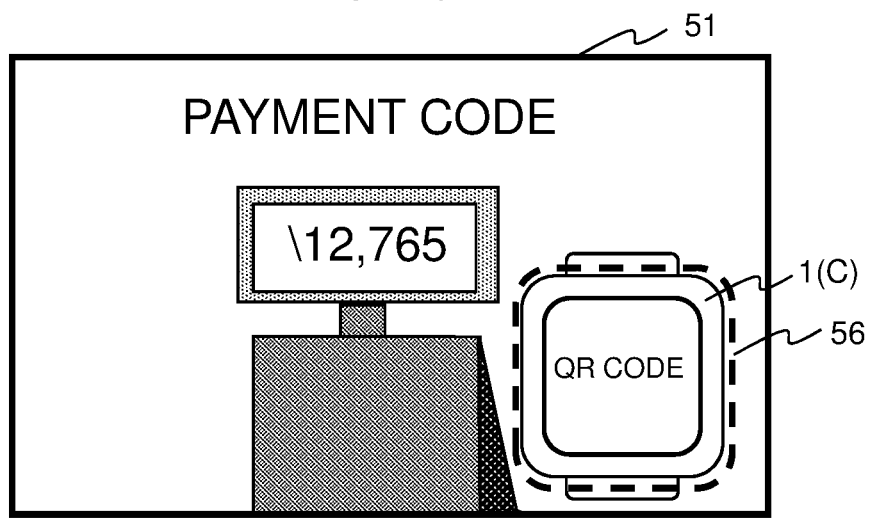
FIG. 18A and FIG. 18B are schematic views illustrating cooperative operation mode transition in Example 10.
Figure 18B:
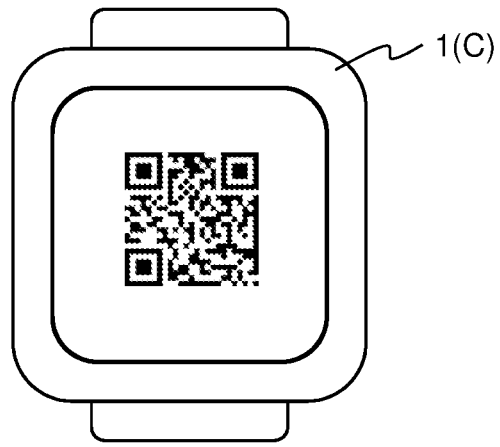

On the other hand, as with FIG. 18A and FIG. 18B, the index of the information may be displayed on the HMD, the appearance of the smart watch may overlap with the part of displaying the index, the app of the smart watch may be activated in the cooperative operation, and the corresponding information (here, the QR code) may be displayed. Here, an example is provided in which the QR code that is scanned on a store side is displayed on the smart watch.

Example 11

In this Example, an example will be described the function of the cooperative operation may be a function other than display, in Example 9.

Figure 19A:
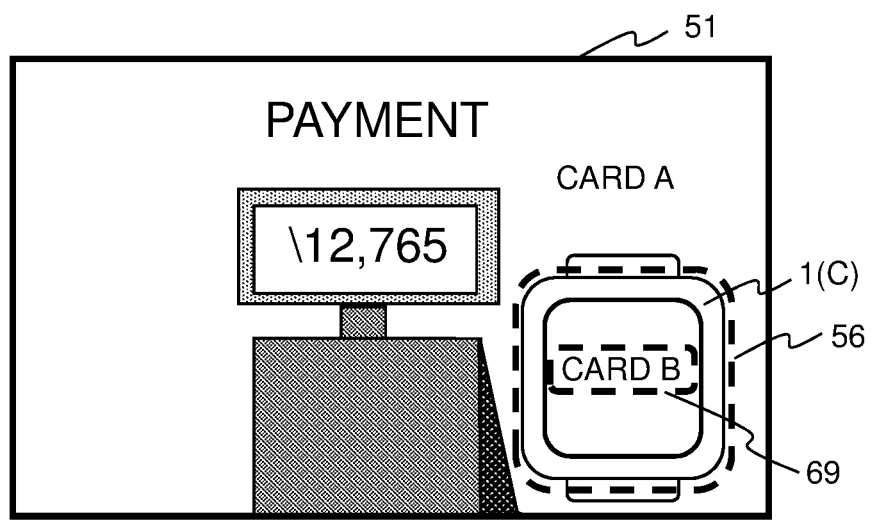
FIGS. 19A and 19B are schematic views illustrating cooperative operation mode transition in Example 11.
Figure 19B:
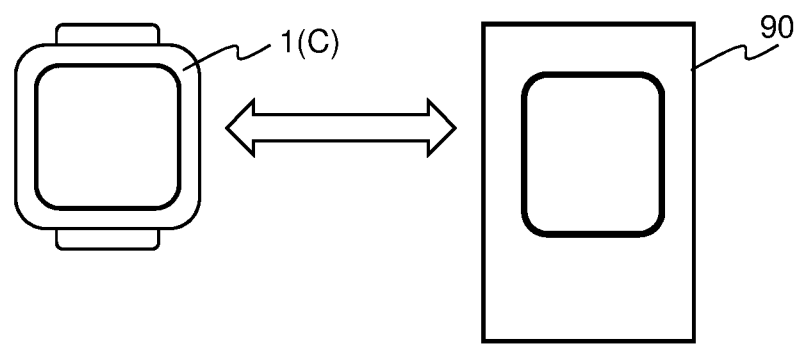

FIG. 19A and FIG. 19B are schematic views illustrating cooperative operation mode transition in this Example. In FIG. 19A and FIG. 19B, the same reference numerals will be applied to the same configurations as those in FIG. 17A and FIG. 17B, and the description thereof will be omitted.

FIG. 19A and FIG. 19B illustrate an example in which the smart watch 1(C) functions as a near field communication (NFC) embedded card. As illustrated in FIG. 19A, the appearance of the smart watch overlaps with a card name position displayed on the display screen of the HMD, and the selection operation is performed, and thus, a cooperative app on the smart watch side is activated. The selection operation may be performed on the HMD side or the smart watch side. A frame 69 of a dotted line that is superimposed on the card name is an AR object representing that the card is set to the selection candidate.

In a case where a plurality of display items of the HMD overlap with the appearance of the smart watch, a display item closer to a predetermined position (for example, the center position) of the appearance of the smart watch is selected.

As illustrated in FIG. 19B, the smart watch activates a cooperative app corresponding to a card B in FIG. 19A, and for example, performs a transaction with a card reader 90 by using the smart watch, and thus, is capable of performing the payment.

Example 12

Figure 20:
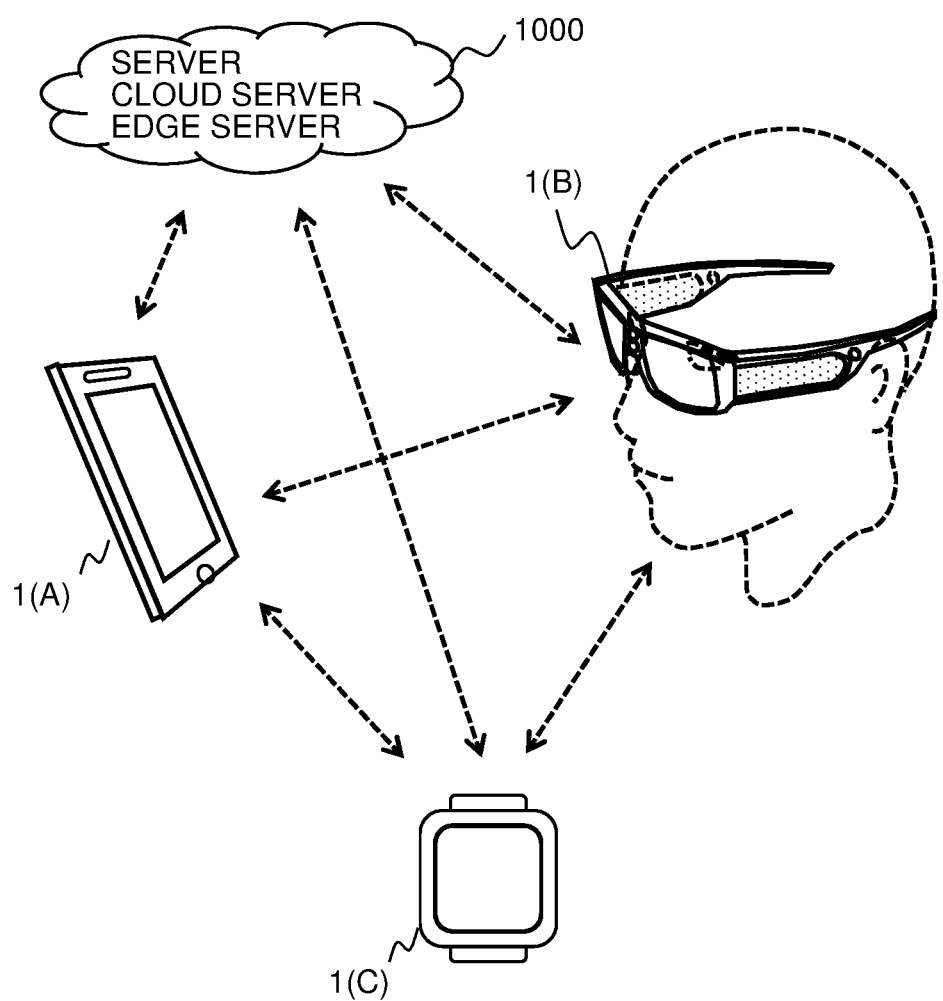
FIG. 20 is a configuration schematic view of an information processing system in Example 12.

FIG. 20 is a configuration schematic view of an information processing system in this Example, in which a server 1000 is added to FIG. 1.

In this Example, as illustrated in FIG. 20, an information processing system is provided in which in all Examples described above, in each of the information terminal devices of the smart phone 1(A), the HMD 1(B), and the smart watch 1(C), not only is cooperative control performed through direct communication but also the transmission/reception of the information or the cooperative control is performed through the server 1000. In addition, in each of the information terminal devices, apps and files, and data stored on the server 1000 may be suitably acquired and used by communication. In addition, the server 1000 may execute the app on the server 1000, and may provide execution information to the information terminal device, instead of the information terminal device selecting the execution of the app, depending on each of Examples described above. That is, the server 1000 performs the mediation of the communication in the plurality of information terminal devices or the alternate execution of the app.

Note that, the server 1000 may be connected to each of the information terminal devices through the communication to be capable of controlling the cooperative operation or executing the app, and for example, is a local server, a cloud server, an edge server, a net service, or the like, and the form thereof is not limited.

Examples have been described, but Examples described above have been described in detail in order to explain the present invention in a simple way, and are not necessarily limited to having all the having all the configurations described above. In addition, a part of the configuration of one Example can be replaced with the configuration of the other Example, and the configuration of the other Example can also be added to the configuration of one Example. In addition, a part of the configuration of each of Examples can be added/deleted/replaced with the other configuration.

REFERENCE SIGNS LIST

1 Information terminal device
1(A) Smart phone (smartphone)
1(B) Head mounted display device (HMD)
1(C) Smart watch
101 Processor (controller)
4 Sensor device
6 Camera
7 Ranging sensor
50 Display device
80 Communication device
51 Display screen of HMD
52, 53 App icon of HMD
54 Pointer of HMD
60 App icon of smartphone
63, 65 AR object
83 Manipulation input device
90 Card reader
1000 Server

The invention claimed is:
1. A first information terminal device executing an application, comprising;
   a camera,
   a display,
   a communication device that communicates with an external device,
   an input device that detects an operating for input to the first information terminal device, and
   a controller,
   wherein the communication device is configured to communicate with a second information terminal device,
   wherein the controller is configured to control changing an operation mode, the operation mode includes a solo operation mode activating only a first application of the first information terminal device in accordance with the operation for input to the first information terminal device and a cooperative operation mode activating a second application of the second information terminal device using the communication device with the first application in accordance with the operation for input to the first information terminal device,
   wherein the camera is configured to capture a first picture of the surroundings of the first information terminal device,
   wherein the display is configured to display the first picture and an icon for the application of the first information terminal device, and
   wherein the controller is configured to control the operation mode to activate the cooperative operation mode if the icon is selected when a second picture of the second information terminal device in the first picture on the display and the icon overlap when displaying the first picture on the display.

2. The first information terminal device according to claim 1,
wherein the display is configured to display an icon for application, wherein the controller is configured to control changing the operation mode of the solo operation mode or the cooperative operation mode if the input device detects a number of consecutive selection actions in a predetermined time interval or less.

3. The first information terminal device according to claim 1,
wherein the icon is configured to include information to identify the second information terminal in correspondence to the icon, and
wherein controller is configured to control the display to display a status indicating whether or not the second information terminal device is available to activate the cooperative mode.

* * * * *